United States Patent [19]

Hwang

[11] Patent Number: 5,907,795
[45] Date of Patent: May 25, 1999

[54] BATTERY SAVING RADIO PAGING SIGNAL TRANSMITTING AND RECEIVING SYSTEM

[75] Inventor: Seon-Woong Hwang, Kyungki-do, Rep. of Korea

[73] Assignee: SamSung Electronics Co., Ltd., Suwon, Rep. of Korea

[21] Appl. No.: 08/710,723

[22] Filed: Sep. 19, 1996

[30] Foreign Application Priority Data

Sep. 19, 1995 [KR] Rep. of Korea ...................... 95/30759

[51] Int. Cl.[6] ............................... H04B 7/26; H04Q 3/02
[52] U.S. Cl. ........................ 455/38.3; 455/458; 455/343; 340/825.44
[58] Field of Search .................................... 455/422, 426, 455/432, 436, 458, 31.2–31.3, 38.1–38.3, 574, 343, 38.5; 340/825.44, 311.1

[56] References Cited

U.S. PATENT DOCUMENTS

| 4,431,991 | 2/1984 | Bailey et al. ........................... 455/38.5 |
| 4,644,347 | 2/1987 | Lucas et al. ......................... 340/825.44 |
| 5,122,795 | 6/1992 | Cubley et al. .......................... 455/31.2 |
| 5,230,084 | 7/1993 | Nguyen . |
| 5,274,843 | 12/1993 | Murai et al. . |
| 5,376,929 | 12/1994 | Rakolta et al. . |
| 5,376,975 | 12/1994 | Romero et al. . |
| 5,384,564 | 1/1995 | Wycoff et al. .......................... 455/38.3 |
| 5,448,756 | 9/1995 | DeLuca et al. . |
| 5,459,457 | 10/1995 | Sharpe . |
| 5,475,374 | 12/1995 | Moore . |
| 5,497,145 | 3/1996 | Yung et al. . |
| 5,507,040 | 4/1996 | Eaton et al. . |
| 5,677,681 | 10/1997 | Tanaka et al. ......................... 455/38.1 |

Primary Examiner—Nguyen Vo
Attorney, Agent, or Firm—Robert E. Bushnell, Esq.

[57] ABSTRACT

A battery saving radio paging signal transmitting and receiving system includes an exchange for receiving a call request from a given terminal. I response to the call request, the exchange transmits a call message to a radio paging transmitter to enable communication with a radio paging receiver. The radio paging transmitter receives and encodes the call message to generate a call signal, and determines whether a subscriber corresponding to the radio paging receiver is a local area service subscriber or a wide area service subscriber based on a radio paging number provided in the call message. The radio paging transmitter initially transmits the call signal in a non-inverted state when the subscriber is a local area service subscriber, and initially transmits the call signal in an inverted state when the subscriber is a wide area service subscriber. The radio paging receiver adjusts an operating power source to activate one of a batch mode and an idle mode in accordance with the inversion and non-inversion of the call signal received from the radio paging transmitter.

16 Claims, 6 Drawing Sheets

```
                                              55555555
55555555 55555555 55555555 55555555 55555555 55555555
55555555 55555555 55555555 55555555 55555555 55555555
7CD215D8 7A89C197 0152BD48 CAFD0529 C5092346 7A89C197 7A89C197
7A89C197 7A89C197 7A89C197 7A89C197 7A89C197 7A89C197 7A89C197
00000000 00000000 00000000 00000000 00000000 00000000
```

Fig. 6B

```
                                                                AAAAAAAA
AAAAAAAA AAAAAAAA AAAAAAAA AAAAAAAA AAAAAAAA AAAAAAAA AAAAAAAA
AAAAAAAA AAAAAAAA AAAAAAAA AAAAAAAA AAAAAAAA AAAAAAAA AAAAAAAA
832DEA27 85763E68 FEAD42B7 3502FAD6 3AF6DEB 985763E68 85763E68
85763E68 85763E68 85763E68 85763E68 85763E68 85763E68 85763E68
FFFFFFFF FFFFFFFF FFFFFFFF FFFFFFFF FFFFFFFF FFFFFFFF FFFFFFFF
```

BATTERY SAVING RADIO PAGING SIGNAL TRANSMITTING AND RECEIVING SYSTEM

CROSS-REFERENCE TO RELATED APPLICATIONS

This application makes reference to, incorporates the same herein, and claims all benefits accruing under 35 U.S.C. §119 arising from an application for *Battery Saving Radio Paging Signal Transmitting And Receiving System* earlier filed in the Korean Industrial Property Office on Sep. 19, 1995 and there duly assigned Ser. No. 30,759/1995.

BACKGROUND OF THE INVENTION

The present invention relates to a radio paging signal transmitting and receiving system, and more particularly, to a radio paging signal transmitting and receiving system capable of saving battery power.

A radio paging receiver is often provided with a battery saving circuit for periodically, rather than continuously, supplying electrical power to a radio frequency circuit in order to reduce the consumption of electrical power provided from a battery. One example of this type of art is disclosed in Korean Patent Application No. 1992-2739 by the same applicant as the present invention, and assigned to Samsung Electronics, Co., Ltd.

Since battery consumption in the radio paging receiver is an important issue, various battery saving circuits have been applied to the radio paging receiver. U.S. Pat. No. 5,376,975 issued to Romero et al., for example, discloses a method and apparatus for saving battery power during the preamble of a paging signal in a selective call receiver. This is achieved through a processor that provides signals to a battery saving circuit to activate and deactivate receiver circuitry during reception of the preamble signal in response to detection of a portion of the preamble signal.

Another exemplar of contemporary art, U.S. Pat. No. 5,448,756 issued to DeLuca et al. discloses a radio paging receiver that receives information on a radio carrier and switches portions of the receiver on and off at a rate greater than the bandwidth of the information, thereby reducing the amount of power consumed by the receiver.

While these contemporary approaches to conserving power in a radio paging receiver possess merit in their own right, I believe that an improved system can be contemplated that incorporates power saving features into a radio paging transmitter, and accordingly seeks to maximize the conservation of battery power.

SUMMARY OF THE INVENTION

It is therefore an object of the present invention to provide an improved battery saving radio paging signal transmitting and receiving system.

It is another object to provide battery saving radio paging signal transmitting and receiving system in which a format of data to be transmitted is controlled in a radio paging receiver as well as a radio paging transmitter.

It is still another object to provide a battery saving radio paging signal transmitting and receiving system in which a radio paging receiver selectively processes inverted and non-inverted data.

To achieve these and other objects, the present invention provides a battery saving radio paging signal transmitting and receiving system including an exchange for receiving a call request from a given terminal. In response to the call request, the exchange transmits a call message to a radio paging transmitter to enable communication with a radio paging receiver. The radio paging transmitter receives and encodes the call message to generate a call signal, and determines whether a subscriber corresponding to the radio paging receiver is a local area service subscriber or a wide area service subscriber based on a radio paging number provided in the call message. The radio paging transmitter initially transmits the call signal in a non-inverted state when the subscriber is a local area service subscriber, and initially transmits the call signal in an inverted state when the subscriber is a wide area service subscriber. The radio paging receiver adjusts an operating power source to activate one of a batch mode and an idle mode in accordance with the inversion and non-inversion of the call signal received from the radio paging transmitter.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

In the following detailed description, many specific terms such as an area name, an area number, a reference channel frequency and a service channel frequency are utilized to provide a comprehensive understanding of the present invention. It will be evident to those of ordinary skill in the art that the present invention can be practiced without such specific terms. Detailed descriptions of known functions or constructions are omitted so as not to obscure the subject matter of the present invention.

Hereinafter, the term "reference channel frequency" represents a frequency utilized by a local area service subscriber that is generated, for example, from a phase locked loop PLL of a frequency synthesizer. The term "service channel frequency" represents a frequency utilized by a wide area service subscriber that is generated, for example, from a phase locked loop PLL of a frequency synthesizer. The term "CAP code" represents an address of a radio paging receiver and contains specific bits of area information that represent a group of subscribers within a given area. The term "area group" represents a group of subscribers within an area that utilize an identical frequency in carrying out a radio paging service. The term "area group" is similar to the concept of a "cell" in mobile communication systems. A term "common area group" represents a remote area group of subscribers that are far away from one another, and utilize a common reference channel frequency.

Figure 1:
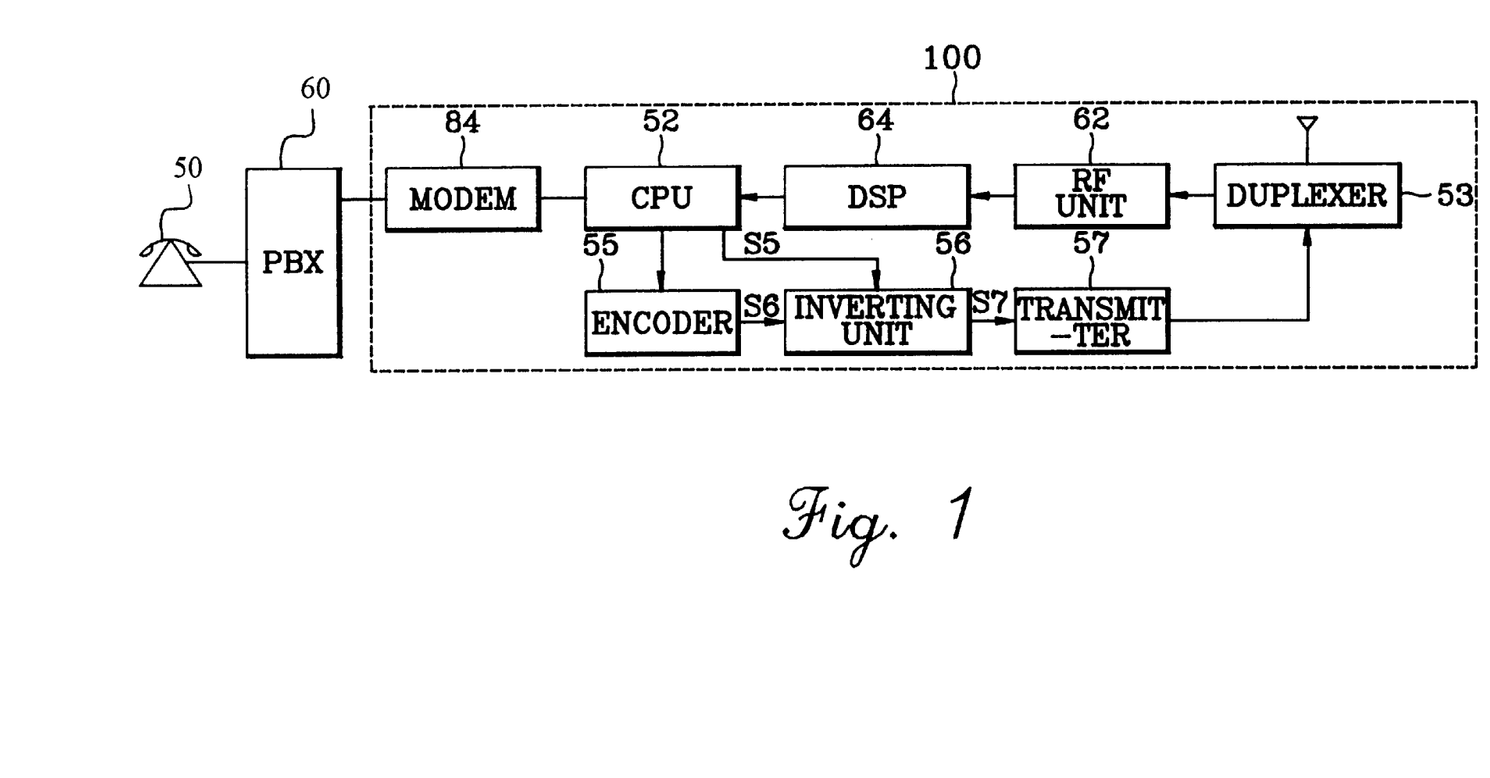
FIG. 1 illustrates a battery saving radio paging signal transmitting and receiving system constructed according to the principles of the present invention.

Turning now to the drawings and referring to FIG. 1, a battery saving radio paging signal transmitting and receiving system constructed according to the principles of the present invention is shown. In FIG. 1, a private branch exchange 60 is connected between an exemplary subscriber terminal 50 and a radio paging transmitter 100. Radio paging transmitter 100 includes a modem 84 connected to private branch exchange 60 for modulating and demodulating data. A central processing unit (CPU) 52 is connected to modem 84 and controls the operations of radio paging transmitter 100. A digital signal processor (DSP) 64 is connected to central processing unit (CPU) 52 and performs a digital signal processing operation. An encoder 55 is also connected to central processing unit (CPU) 52 and performs a data encoding operation. The remaining components of radio paging transmitter 100 include: a radio frequency (RF) unit 62, a duplexer 53 connected to an antenna, a transmitter 57, and an inverting unit 56. Inverting unit 56 is provided for inverting the logic state of a calling signal during given intervals, as will be discussed later in this application.

Figure 2:
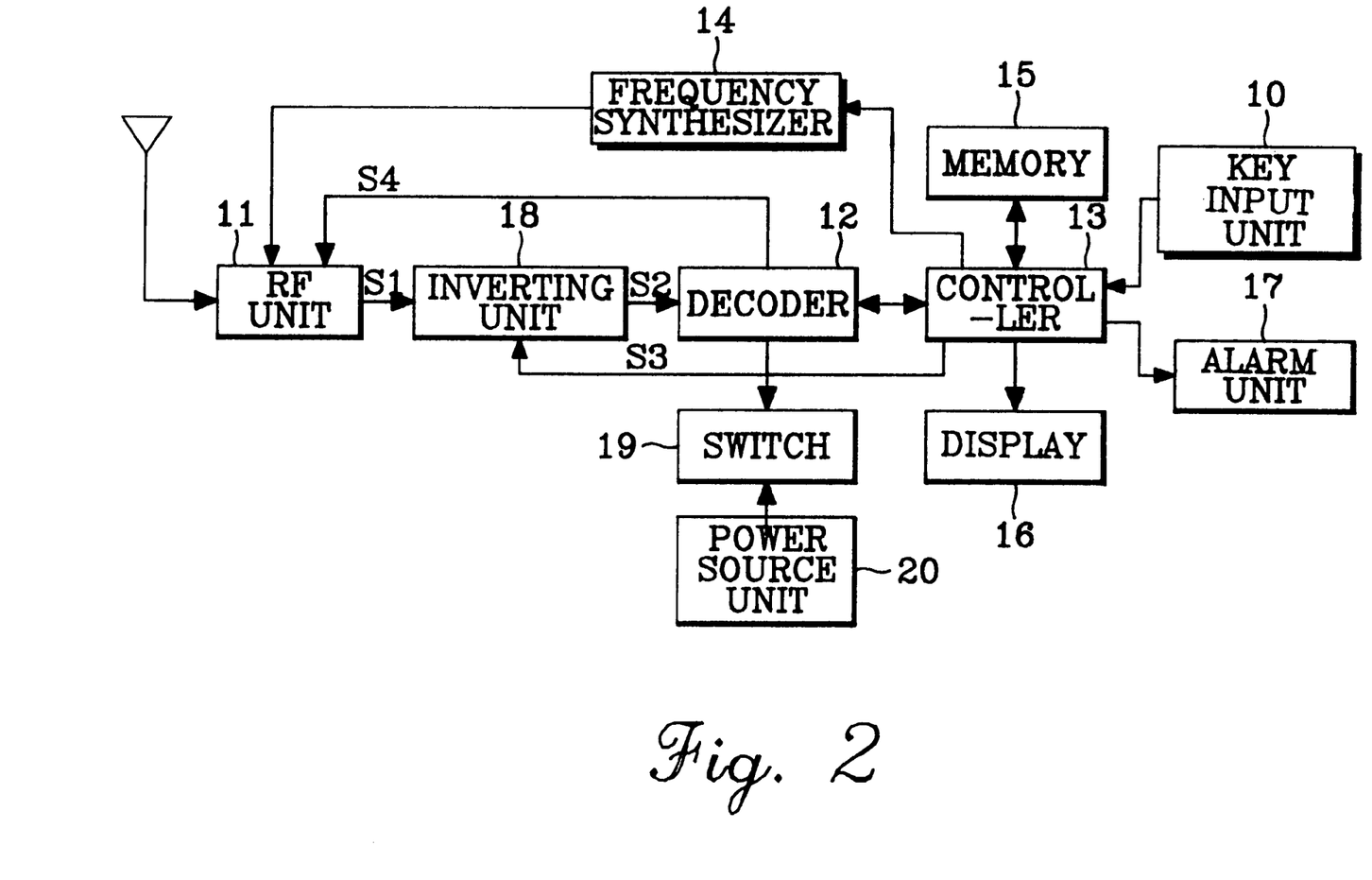
FIG. 2 illustrates a battery saving radio paging receiver constructed according to the principles of the present invention.
Figure 4:
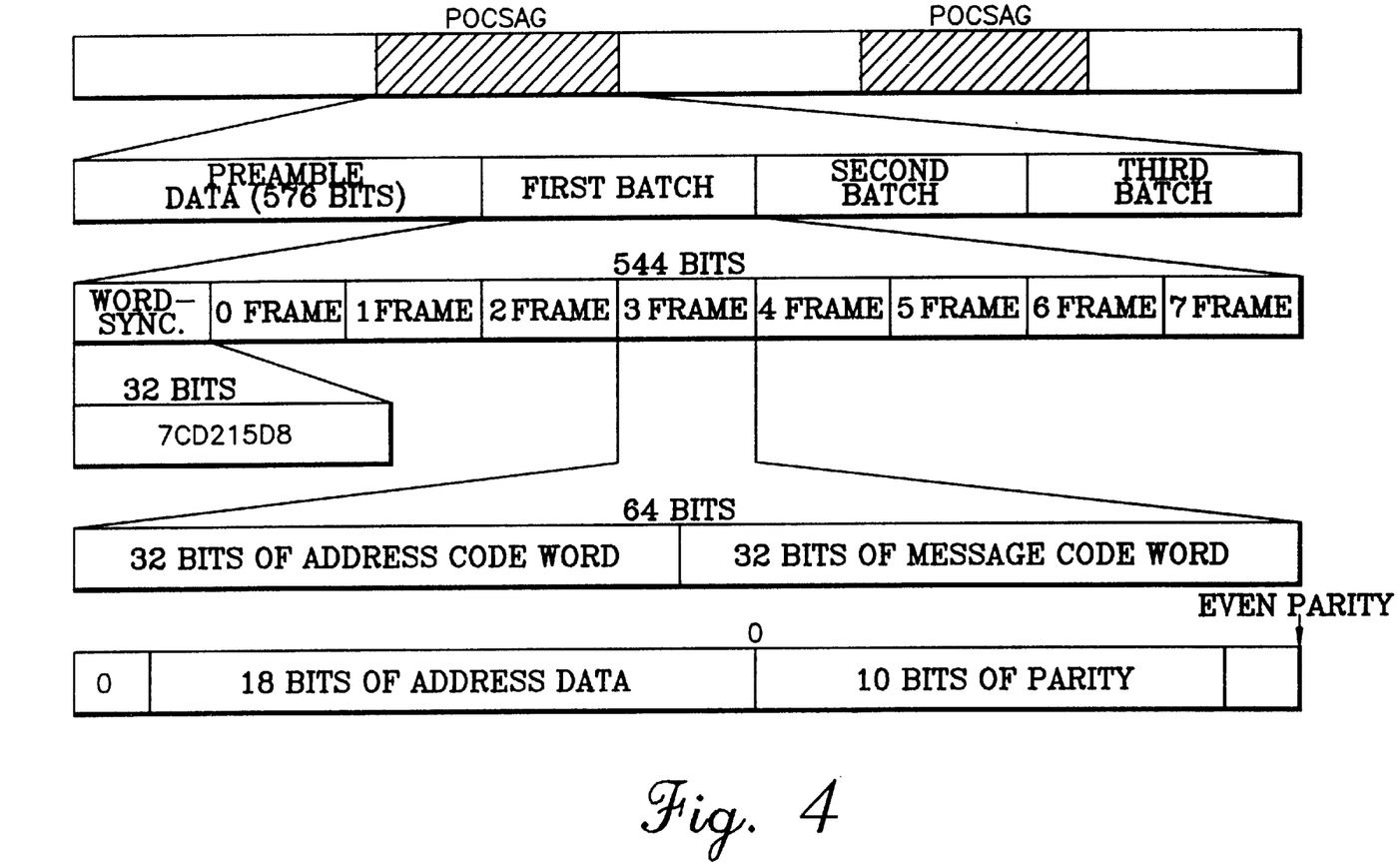
FIG. 4 illustrates the format of the Post Office Code Standardization Advisory Group (hereinafter, "POCSAG") code utilized in the battery saving radio paging receiver of the present invention.

Referring now to FIG. 2, a battery saving radio paging receiver constructed according to the principles of the present invention is shown. In FIG. 2, a key input unit 10 includes a plurality of keys for generating various control signals of the radio paging receiver. The keys include, for example, a power source key for turning the radio paging receiver on and off, a battery saving mode key for performing a channel scanning operation according to constant time periods during execution of a channel scanning mode of the radio paging receiver, and a read key for displaying received and stored messages. A radio frequency unit 11 designates a channel according to a frequency synthesizer 14, amplifies a weak radio frequency (RF) signal from the designated channel that is received through an antenna, converts a frequency of the amplified signal into an initial signal band, demodulates the converted frequency, shapes a waveform of the demodulated signal to generate digital data, and outputs the shaped waveform signal as digital data. A decoder 12 decodes the digital data output from radio frequency (RF) unit 11 to generate decoded data, and provides output of the decoded data. In other words, decoder 12 receives and decodes binary coded hexidecimal (BCH) data, and detects and outputs preamble data, wordsync data and frame data corresponding to the radio paging receiver in the POCSAG format, as shown in FIG. 4.

An electrically erasable, programmable read only memory (EEPROM) can be utilized as a memory 15 for storing information corresponding to the radio paging receiver. The CAP code, including frame data and address data containing area information, the reference channel frequencies for setting frequency channels of the area group and the service channel frequencies for having the radio paging service in the area set by the reference channel frequencies, is stored in memory 15. A controller 13 analyzes the information stored in memory 15 to thereby control a radio paging service function of the radio paging receiver. When the radio paging receiver is first turned on in response to input of the power source key from key input unit 10, controller 13 performs a channel scanning function. In other words, controller 13 sequentially selects the reference channel frequencies from memory 15, outputs the selected reference channel frequency according to a constant time period to thereby designate the channel and determines whether data is received from the designated channel. When data is received, controller 13 analyzes area information included in the CAP code to thereby determine the area in which the radio paging receiver is positioned. Controller 13 then outputs the service channel frequency of the concerned area group to thereby analyze frame data received from the designated service channel. When the battery saving mode key is input from key input unit 10, the battery saving mode is set while performing the channel scanning mode, as discussed above. If the battery saving mode is set, a power source control signal for controlling the power source of radio fequency unit 11 is output in the case that the reference channel is not scanned according to a constant time period. Operation of the battery saving mode key is a conventionally known function.

Frequency synthesizer 14 designates the channel of radio frequency unit 11 according to channel data output from controller 13. Channel data represents the reference channel frequencies for designating the reference channel frequency of the area group and the service channel frequencies for the radio paging service of the wide area subscriber.

A display 16 displays received messages and provides indication of various situations during the radio paging service under the control of controller 13. Display 16 can be embodied, for example, as a liquid crystal diode. An alarm unit 17 generates an alarm signal under the control of controller 13 when a message is received. Alarm unit 17 includes a unit for generating an audible alarm tone and a vibrator for generating a tactile vibration.

In FIG, 2, inverting unit 18 determines whether a signal S1 output from radio frequency (RF) unit 11 is to be provided to decoder 12 in a non-inverted logic form or an inverted logic form, in response to a select signal S3 output from controller 13. A power source unit 20 supplies electrical operating power to the radio paging receiver, and a switch 19 provides the electrical power from power source unit 20 according to a batch mode or an idle mode under the control of decoder 12.

Figure 3:
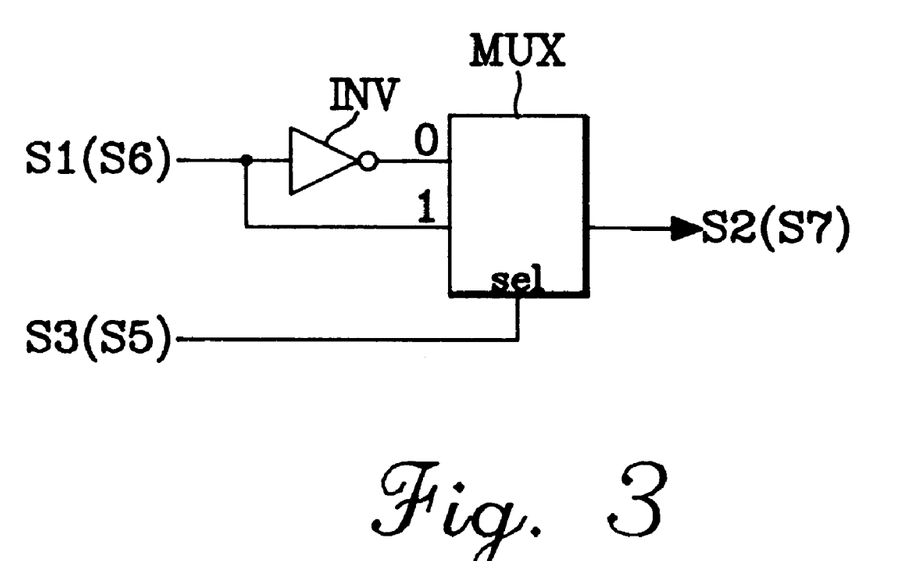
FIG. 3 illustrates a detailed circuit of the inverting unit shown in FIGS. 1 and 2.

FIG. 3 illustrates a detailed circuit of inverting unit 56 and 18 shown in FIGS. 1 and 2, respectively. The inverting unit of FIG. 3 includes an inverter INV and a multiplexer MUX. The signal S1 (or S6 in FIG. 1) output from radio frequency (RF) unit 11 is provided to one input terminal of multiplexer MUX, and the inverted version of signal S1 (or S6 in FIG. 1), which is inverted through inverter INV, is provided to the other input terminal of multiplexer MUX. The select signal S3 (or S5 in FIG. 1) provided from controller 13 is input to a select terminal (sel) of the multiplexer MUX to indicate whether the inverted or non-inverted form of signal S1 (or S6 in FIG. 1) will be output as signal S2 (or S7 in FIG. 1).

FIG. 4 illustrates the format of the POCSAG code utilized in the radio paging receiver of the present invention. The POCSAG code is well-known to those skilled in the art, and is commonly utilized in many countries. A more detailed description of the POCSAG code is disclosed in CCIR recommendation 584.

One POCSAG code is comprised of 576 bits of preamble data and several intervals of batch data in a continuous arrangement. The preamble data is a code in which logical 1's and 0's are alternately repeated for 576 bits (i.e., a redundancy code). One POCSAG code includes between 30 and 60 batches of data. One batch of data includes 32 bits of wordsync data and 8 frames of data, wherein each frame includes 64 bits. In FIG. 4, the wordsync data contains 32 bits of data (i.e., "7CD215D8" in hexidecimal and "01111100 11010010000101011101100" in binary). Also, each frame of data includes 64 bits of data (i.e., 32 bits of an address codeword and 32 bits of a message codeword). Accordingly, one batch of data includes 544 bits. That is, 17 words with each word having 32 bits (i.e., 17 words×32 bits=544 bits).

Preamble data is used for detecting a received signal, and providing synchronization to the clock bit of the received signal. Wordsync data is utilized to perform a wordsync operation that enables detection of the address and message codewords and idle states during transmission.

Figure 5A:
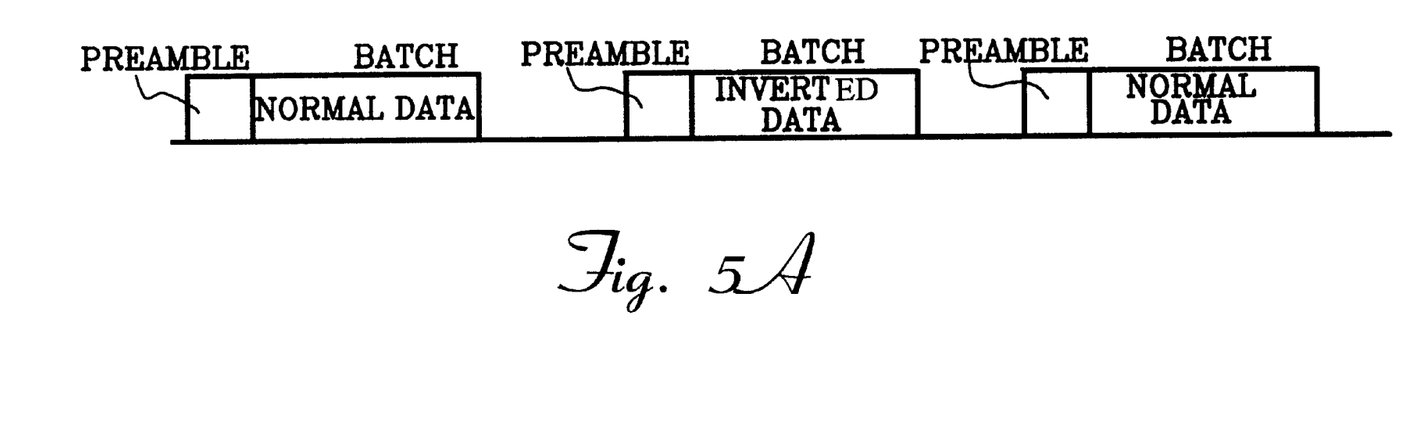
FIGS. 5A and 5B illustrate waveforms of the battery saving transmitting and receiving operations according to the principles of the present invention.
Figure 5B:
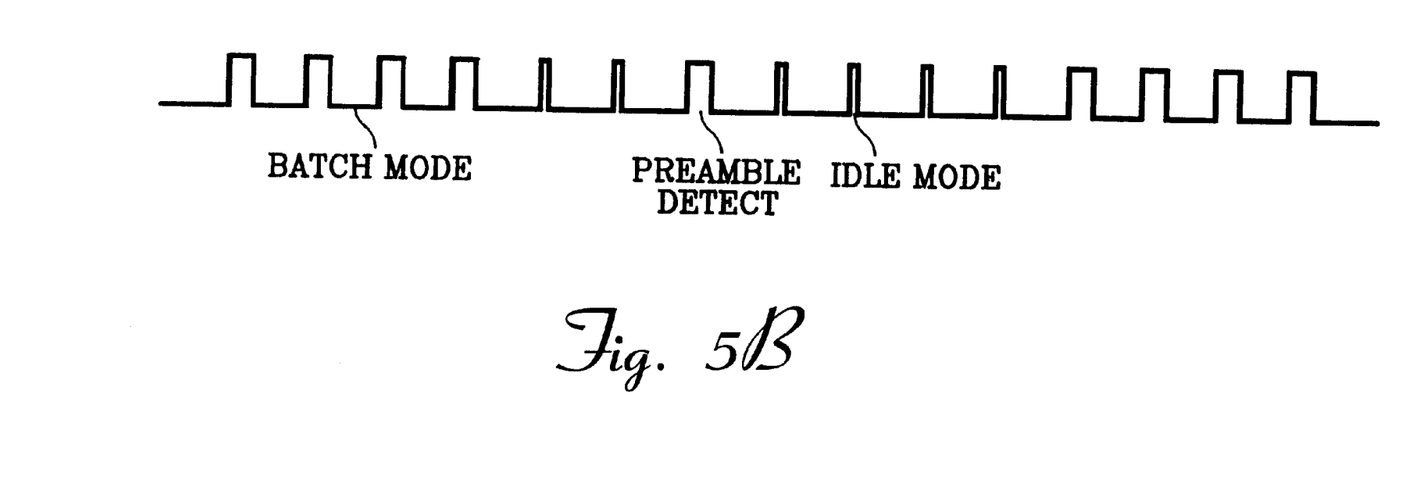

FIGS. 5A and 5B illustrate waveforms of the battery saving transmitting and receiving operations according to the principles of the present invention. As indicated in FIG. 5A, radio paging transmitter 100 alternately transmits normal (i.e., non-inverted) data and inverted data. The radio paging receiver shown in FIG. 2 detects only normal, non-inverted data when the subscriber being paged through the radio paging receiver is determined to be a local area service subscriber. In this case, since the radio paging receiver detects only the normal, non-inverted data and does not detect the inverted data, the radio paging receiver treats the inverted data as noise. Preamble data, however, is detected since it is merely a redundancy code of repeated 1's and 0's. Alternatively, the radio paging receiver shown in FIG. 2 detects only inverted data when the subscriber being paged through the radio paging receiver is determined to be a wide area service subscriber. In this case, since the radio paging receiver detects only the inverted data and does not detect the normal, non-inverted data, the radio paging receiver treats the non-inverted data as noise.

Figure 6A:
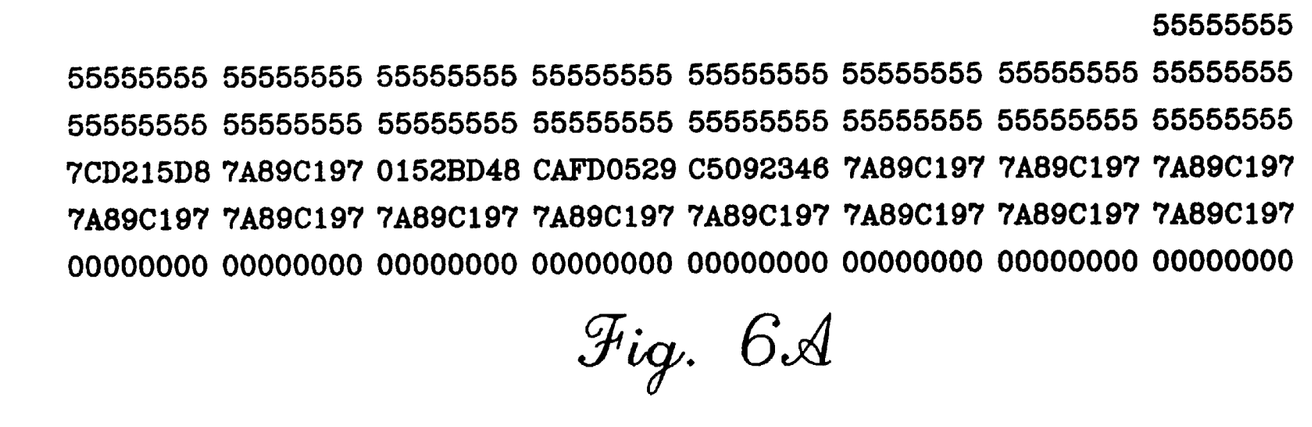
FIGS. 6A and 6B illustrate an example of normal data and inverted data, respectively.
Figure 6B:
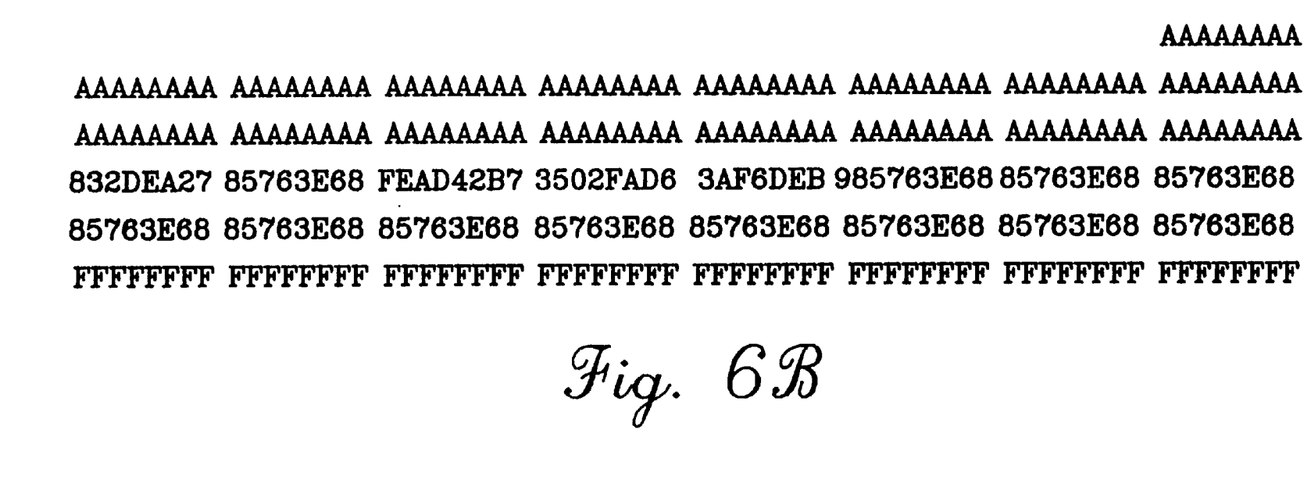

FIGS. 6A and 6B illustrate an example of normal data and inverted data, respectively. The data shown in FIGS. 6A and 6B is represented in hexadecimal notation.

Referring to FIGS. 1 through 6B, a battery saving radio paging signal transmitting and receiving method according to the principles of the present invention will now be described.

When the private branch exchange 60 receives a call request from a given subscriber terminal 50, private branch exchange 60 transmits a call message to central processing unit (CPU) 52 to enable communication with a given radio paging receiver. Central processing unit (CPU) 52 transmits the received call message to encoder 55, to thereby generate a call signal having the POCSAG code format. The call signal output from the encoder 55 is passed through inverting unit 56, and is provided to transmitter 57 in either a normal, non-inverted state or an inverted state in dependence upon a first select signal S5 generated by central processing unit (CPU) 52. The call signal is then transferred to duplexer 53, and output through the antenna as a radio wave.

The first select signal S5 is generated by central processing unit (CPU) 52 based on whether the subscriber being paged is a local area service subscriber or a wide area service subscriber. Central processing unit (CPU) 52 determines whether the subscriber being paged is a local area service subscriber or a wide area service subscriber from a radio paging number included in the call message. As a result, radio paging transmitter 100 alternately transmits the call signal to the radio paging receiver of the subscriber being paged in a non-inverted and inverted state, as shown in FIG. 5A. When the subscriber being paged is a local area service subscriber, the call signal is initially transmitted in the normal, non-inverted state. Alternatively, when the subscriber being paged is a wide area service subscriber, the call signal is initially transmitted in the inverted state. This transmission scheme is merely exemplary, and it is contemplated that the call signal could be initially transmitted in the inverted state when the subscriber being paged is a local area service subscriber, and could be initially transmitted in the normal, non-inverted state when the subscriber being paged is a wide area service subscriber.

In the case of a wide area service subscriber, when the power source to the subscriber's radio paging receiver having a configuration as shown in FIG. 2 is turned on by switch 19, controller 13 reads out information from memory 15 that stores the reference channel frequency, the service channel frequency and the CAP code corresponding to the radio paging receiver. The radio paging receiver is then synchronized to the reference channel frequency, to thereby determine whether data is received. At this time, the radio paging receiver receives normal data by having a second select signal S3 exhibit a logic state of "0". Accordingly, area information of the CAP code is analyzed from the received data. Then, before the radio paging receiver is synchronized to the applicable service channel frequency to thereby receive the substantial portion of the call signal, the received call signal transmitted from radio frequency (RF) unit 11 to decoder 12 is inverted via inverting unit 18 by having the second select signal S3 exhibit a logic state of "1". Therefore, the radio paging receiver accurately detects only the call signal being transmitted in the inverted state for the wide area service subscriber.

Referring to FIG. 5B, the radio paging receiver of the local area service subscriber generates a battery saving signal to activate the idle mode when receiving inverted data to thereby save power. In the same manner, the radio paging receiver of the wide area service subscriber generates the battery saving signal to activate the idle mode when receiving normal, non-inverted data to thereby save power.

As discussed above, the battery saving radio paging signal transmitting and receiving system constructed according to the principles of the present invention has an advantage in that the radio paging receiver can selectively process non-inverted data and inverted data transmitted by the transmitter, thereby increasing a battery saving effect.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A battery saving radio paging signal transmitting and receiving system, comprising an exchange, a radio paging transmitter and a radio paging receiver;

said exchange receiving a call request from a given terminal and, in response to said call request, transmitting a call message to enable communication with said radio paging receiver;

said radio paging transmitter receiving and encoding said call message to generate a call signal, and determining whether a subscriber corresponding to said radio paging receiver belongs to a first group or a second group based on a radio paging number provided in said call message, said radio paging transmitter initially transmitting said call signal in a non-inverted state when the subscriber belongs to said first group and initially transmitting said call signal in an inverted state when the subscriber belongs to said second group; and said radio paging receiver adjusting an operating power source to activate one of a batch mode and an idle mode in accordance with the inversion and non-inversion of said call signal received from said radio paging transmitter;

wherein, when said subscriber belongs to said first group, said radio paging receiver adjusts said operating power source to activate said batch mode during reception of said call signal in said non-inverted state, and adjusts said operating power source to activate said idle mode during reception of said call signal in said inverted state; and wherein, when said subscriber belongs to said second group, said radio paging receiver adjusts said operating power source to activate said batch mode for reception of said call signal in said inverted state, and adjusts said operating power source to activate said idle mode for reception of said call signal in said non-inverted state.

2. The battery saving radio paging signal transmitting and receiving system as claimed in claim 1, wherein the subscriber belonging to said first group is a local service subscriber, and the subscriber belonging to said second group is a wide area service subscriber.

3. The battery saving radio paging signal transmitting and receiving system as claimed in claim 1, further comprised of said radio paging transmitter alternately transmitting said call signal in said inverted state and said non-inverted state.

4. The battery saving radio paging signal transmitting and receiving system as claimed in claim 2, further comprised of said radio paging transmitter alternately transmitting said call signal in said inverted state and said non-inverted state.

5. A battery saving radio paging transmitter, comprising:
means for receiving a call message from an exchange, encoding said call message to generate a call signal, and determining whether a subscriber being paged is a general service subscriber or a wide area service subscriber based on a radio paging number provided in said call message; and inverting means for initially transmitting said call signal in a non-inverted state when the subscriber being paged is said general service subscriber, and for initially transmitting said call signal in an inverted state when the subscriber being paged is said wide area service subscriber;

wherein said inverting means comprises:
a multiplexer for receiving said call signal in said non-inverted state and said inverted state, and selectively outputting said call signal in said non-inverted state and said inverted state; and
a logic inverter for logically inverting said call signal to generate said call signal in said inverted state, and providing said call signal in said inverted state to said multiplexer.

6. The battery saving radio paging transmitter as claimed in claim 5, wherein said call signal is alternately transmitted in said inverted state and said non-inverted state.

7. A radio paging receiver, comprising:
receiving and decoding means for receiving a call signal from a radio paging transmitter, decoding said call signal in a non-inverted state while synchronizing said radio paging receiver to a reference channel frequency, and decoding said call signal in an inverted state while synchronizing said radio paging receiver to a service channel frequency;

inverting means for inverting said call signal;
generating means for generating a battery saving signal to activate one of a batch mode and an idle mode of said radio paging receiver in dependence upon the inversion and non-inversion of said call signal; and
supplying means for supplying operating power in dependence upon said battery saving signal;
wherein, when said receiving and decoding means decodes said call signal in said non-inverted state while synchronizing said radio paging receiver to said reference channel frequency, said generating means activates said batch mode for reception of said call signal in said non-inverted state, and activates said idle mode for reception of said call signal in said inverted state;
wherein, when said receiving and decoding means decodes said call signal in said inverted state while synchronizing said radio paging receiver to said service channel frequency, said generating means activates said batch mode for reception of said call signal in said inverted state, and activates said idle mode for reception of said call signal in said non-inverted state.

8. A radio paging receiver, comprising:
receiving and decoding means for receiving a call signal from a radio paging transmitter, decoding said call signal in a non-inverted state while synchronizing said radio paging receiver to a reference channel frequency and decoding said call signal in an inverted state while synchronizing said radio paging receiver to a service channel frequency;

inverting means for inverting said call signal;
generating means for generating a battery saving signal to activate one of a batch mode and an idle mode of said radio paging receiver in dependence upon the inversion and non-inversion of said call signal; and
supplying means for supplying operating power in dependence upon said battery saving signal;
wherein said inverting means comprises:
a multiplexer for receiving said call signal in said non-inverted state and said inverted state, and selectively outputting said call signal in said non-inverted state and said inverted state; and
a logic inverter for logically inverting said call signal to generate said call signal in said inverted state, and providing said call signal in said inverted state to said multiplexer.

9. A method for transmitting and receiving data in a radio paging signal transmitting and receiving system, comprising the steps of:
receiving, at an exchange, a call request provided from a given terminal connected to said exchange;
transmitting a call message from said exchange to a radio paging transmitter in response to said call request to enable communication with a radio paging receiver;
receiving and encoding said call message at said radio paging transmitter to generate a call signal;
determining whether a subscriber corresponding to said radio paging receiver belongs to a first group or a second group based on a radio paging number provided in said call message;
transmitting said call signal from said radio paging transmitter in a non-inverted state when the subscriber belongs to said first group;

transmitting said call signal from said radio paging transmitter in an inverted state when the subscriber belongs to said second group; and receiving said call signal at said radio paging receiver, and adjusting an operating power source of said radio paging receiver to activate one of a batch mode and an idle mode in accordance with the inversion and non-inversion of said call signal;

wherein, when the subscriber belongs to said first group and said call signal is transmitted in said non-inverted state, said operating power source of said radio paging receiver is adjusted to activate said batch mode for reception of said call signal in said non-inverted state, and to activate said idle mode for reception of said call signal in said inverted state; and wherein, when the subscriber belongs to said second group and said call signal is transmitted to said inverted state, said operating power source of said radio paging receiver is adjusted to activate to said batch mode for reception of said call signal in said inverted state, and to activate said idle mode for reception of said call signal in said non-inverted state.

10. The method as claimed in claim 9, wherein the subscriber belonging to said first group is a local service subscriber, and the subscriber belonging to said second group is a wide area service subscriber.

11. The method as claimed in claim 10, further comprised of said radio paging transmitter alternately transmitting said call signal in said inverted state and said non-inverted state.

12. The method as claimed in claim 9, further comprised of said radio paging transmitter alternately transmitting said call signal in said inverted state and said non-inverted state.

13. A battery saving radio paging transmitter, comprising:

receiving means for receiving a call message from an exchange;

processing means for processing said call message from said exchange to determine whether a subscriber being paged is a first type of subscriber or a second type of subscriber, and generating a control signal indicating a type of said subscriber; and an inverter responding to said control signal from said processing means by initially transmitting a call signal in a first one of a non-inverted state and an inverted state when the subscriber being paged is said first type of subscriber, and by initially transmitting said call signal in a second one of a non-inverted state and an inverted state when the subscriber being paged is said second type of subscriber;

wherein said inverter comprises:

a multiplexer for receiving said call signal in said non-inverted state and said inverted state, and selectively outputting said call signal in said non-inverted state and said inverted state; and a logic inverter for logically inverting said call signal to generate said call signal in said inverted state, and providing said call signal in said inverted state to said multiplexer.

14. The battery saving radio paging transmitter of claim 13, further comprised of said radio paging transmitter alternating said transmitting of said call signal in said inverted state and said non-inverted state.

15. A battery saving radio paging transmitter, comprising:

receiving means for receiving a call message from an exchange;

means for determining from said call message received via the exchange whether a subscriber being paged is a local type of subscriber or a wide area service type of subscriber, and generating a control signal indicating a type of said subscriber; and an inverter responding to said control signal from said determining means by initially transmitting a call signal in a first one of a non-inverted state and an inverted state when the subscriber being paged is said local type of subscriber, and by initially transmitting said call signal in a second one of a non-inverted state and an inverted state when the subscriber being paged is said wide area service type of subscriber;

wherein said inverter comprises:

a multiplexer receiving said call signal in said non-inverted state and said inverted state, and selectively outputting said call signal in said non-inverted state and said inverted state; and a logic inverter for logically inverting said call signal to generate said call signal in said inverted state, and providing said call signal in said inverted state to said multiplexer.

16. The battery saving radio paging transmitter of claim 15, further comprised of said radio paging transmitter alternating transmitting said call signal in said inverted state and said non-inverted state.

* * * * *